(No Model.) 2 Sheets—Sheet 1.

G. W. BOWMAN & J. C. GODFREY.
PIPE CUTTER AND THREADER.

No. 472,426. Patented Apr. 5, 1892.

WITNESSES:

INVENTORS:
G. W. Bowman
J. C. Godfrey
BY Munn & Co
ATTORNEYS.

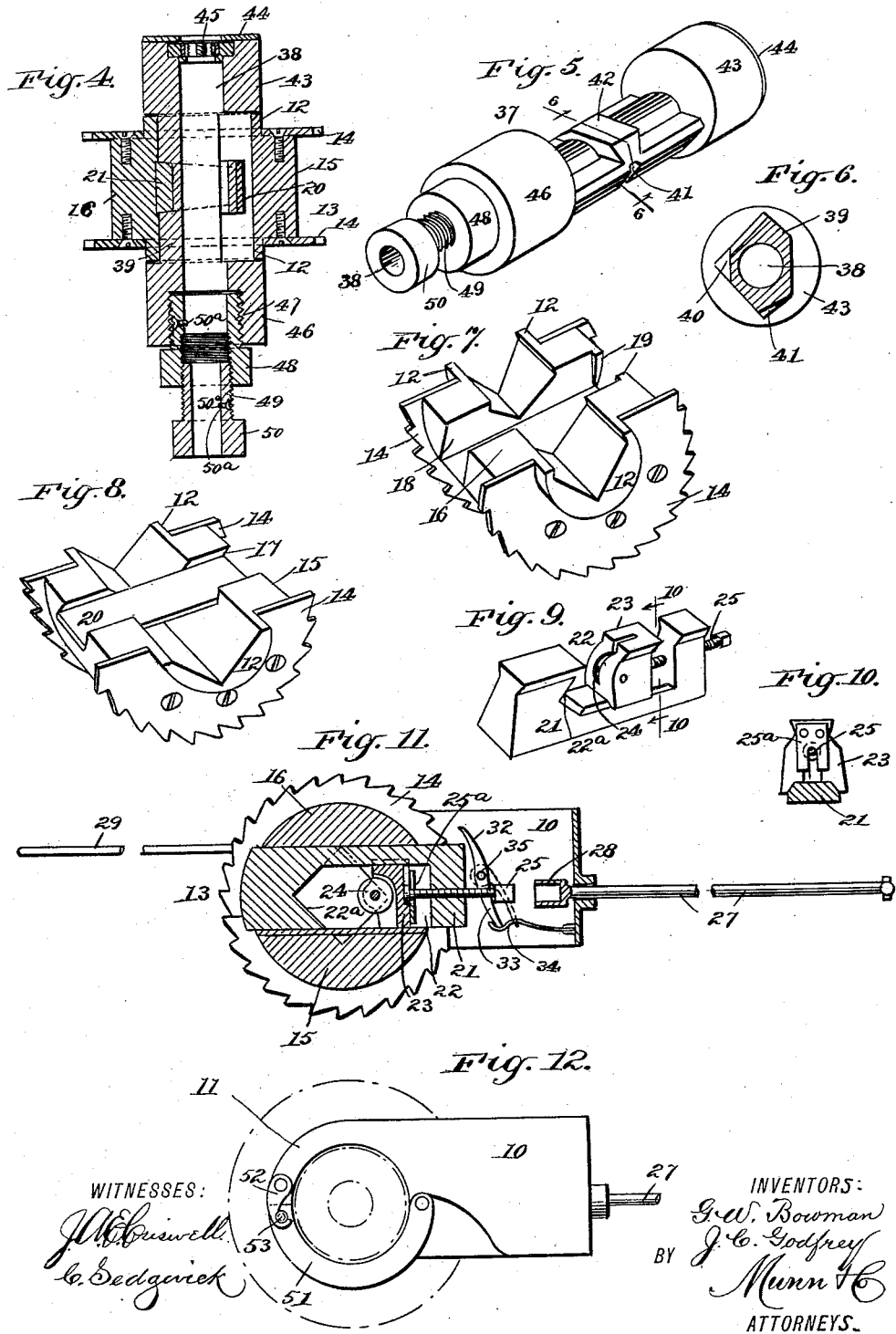

UNITED STATES PATENT OFFICE.

GEORGE W. BOWMAN AND JOHN C. GODFREY, OF RED CLIFF, COLORADO.

PIPE CUTTER AND THREADER.

SPECIFICATION forming part of Letters Patent No. 472,426, dated April 5, 1892.

Application filed September 15, 1891. Serial No. 405,779. (No model.)

*To all whom it may concern:*

Be it known that we, GEORGE W. BOWMAN and JOHN C. GODFREY, both of Red Cliff, in the county of Eagle and State of Colorado, have invented a new and Improved Pipe Cutter and Threader, of which the following is a full, clear, and exact description.

Our invention relates to improvements in pipe cutters and threaders; and the object of our invention is to produce a simple and efficient machine which may be easily applied to different sizes of pipes without removing the pipes from the places in which they are secured, which may be operated by one or more men, and which may be quickly adjusted so as to either cut a pipe off or cut a thread upon it.

To this end our invention consists in certain features of construction and combinations of parts, which will be hereinafter described and claimed.

Reference is to be had to the accompanying drawings, forming a part of this specification, in which similar figures of reference indicate corresponding parts in all the views.

Figure 1:
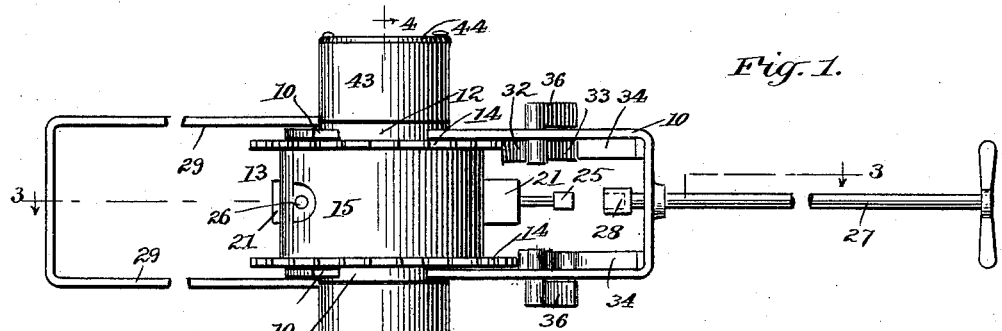
Figure 2:
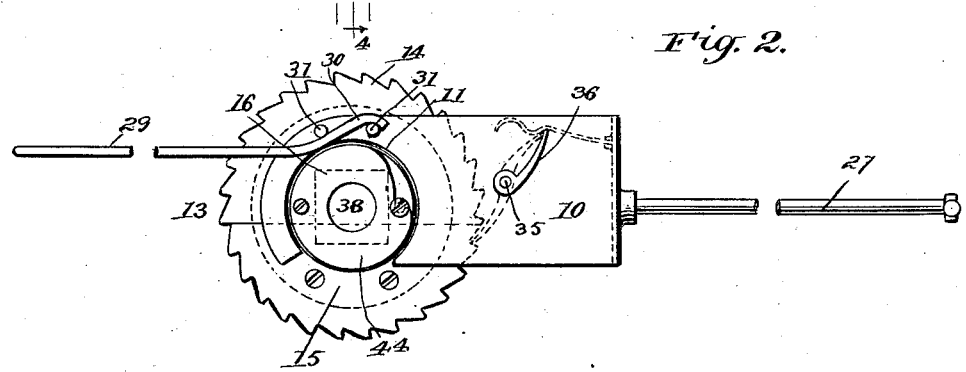
Figure 3:
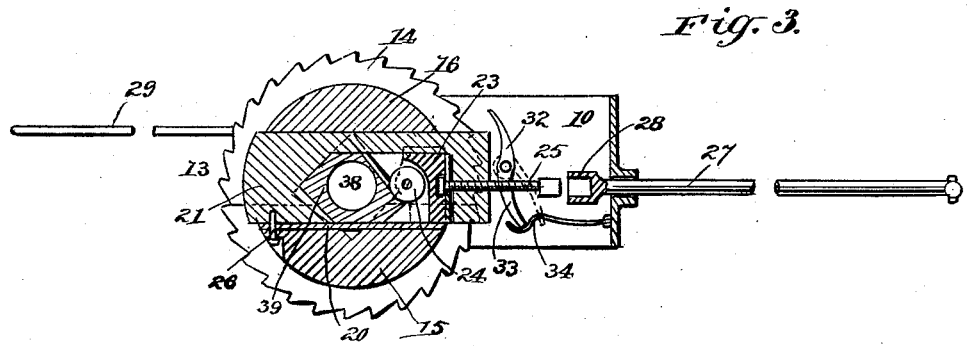

Figure 1 is a broken plan view of the machine. Fig. 2 is a broken end view of the same. Fig. 3 is a vertical cross-section on the line 3 3 in Fig. 1. Fig. 4 is a longitudinal section on the line 4 4 in Fig. 1. Fig. 5 is a detail perspective view of the threader removed from its supporting-hub. Fig. 6 is a cross-section on the line 6 6 in Fig. 5. Fig. 7 is an inside perspective view of one portion of the hub. Fig. 8 is an inside perspective view of the opposite part of the hub. Fig. 9 is a detail perspective view of the locking-key and the slide-block thereon. Fig. 10 is a cross-section on the line 10 10 of Fig. 9. Fig. 11 is a cross-section on the line 3 3 of Fig. 1, but with the threader removed; and Fig. 12 is a detail end view showing a modified form of securing the main hub in its supporting-frame.

The machine is provided with a broad U-shaped frame 10, having in its arms near the open end a recess 11, adapted to receive and support the reduced ends 12 of the hub 13, thus bringing the hub within the arms of the frame, and this hub 13 is thus held to turn in the frame. It is provided at each end with a ratchet-wheel 14, which is firmly secured thereto, the ratchet-wheels having their teeth oppositely inclined to provide for turning the hub in opposite directions, as hereinafter described.

The hub 13 is made in two separable parts 15 and 16, the part 15 having a transverse dovetail recess 17 extending through it and the part 16 having a somewhat similar dovetail recess 18 extending through it, the two recesses being arranged to register with each other when the parts of the hub are united, and the recess 18 has at one end side flanges 19, as best shown in Fig. 7, which flanges limit the movement of the cutter slide-block, as described below.

In the bottom of the recess 17 is a plate 20, which fits against the top surface of the dovetail locking-key 21 and enables the key to slide easily in the recess, and this key 21 is adapted to extend into the recesses 17 and 18 and hold the two parts of the hub firmly together. It will be noticed by reference to Fig. 9 that this key is widened at the top and base, so that it will fit nicely in the dovetail recesses 17 and 18, and consequently when the key is in place the hub will be as solid as if in one piece. This key 21 serves as a stock for the slide-block, which moves in the central recess 22 of the key, and the front wall of this recess is concaved, as best shown at 22ᵃ in Figs. 9 and 11, so that a pipe may fit in the concaved portion and be held in a good position for cutting.

A slide-block 23 is held to slide in the recess 22 of the key 21, the bottom portion of the key being shaped so that the block may slide nicely upon it, as shown in Fig. 10, and this slide-block 23 carries a cutter 24, adapted to impinge upon and cut into a pipe. The slide-block 23 is adjusted by a screw 25, which extends through the rear end of the key 21 and engages a socket-plate 25ᵃ on the slide-block, as shown in Figs. 10 and 11. This screw 25 has a squared head, so that it may be easily engaged by the handle of the machine. When the key is placed in the recesses of the hub, it is held there by a pin 26, extending through the part 15 of the hub and into the key, as best shown in Figs. 1 and 3. The hub is turned by a handle 27, which projects through the back of the frame 10, and the handle is journaled in the frame so that it may turn therein, and is provided at its inner end with a socket 28, adapted to fit the square head of the screw 25. It will thus be seen that the handle 27 may be used for adjusting the screw and slide-block carrying the cutter, and it is also adapted to turn the frame 10 and the hub 13 connected therewith.

In operating on large pipes, where extra power is required, a supplemental handle 29 may be used, which handle is of an approximately U shape and has bent ends 30, adapted to rest between pins 31 on the ends of the hub, as shown in Fig. 2. This will enable two men to operate the machine, one turning on the handle 27 and the other on the handle 29.

The operating connection between the hub and the frame 10 is by means of pawls 32, which are pivoted on the inner sides of the frame and are adapted to engage the ratchet-wheels 14, each pawl having a prolonged rear end 33, which normally rests in the bent end of a spring 34, projecting inward from the base of the frame, and the spring also serves to hold the pawl in engagement with the ratchet-wheel when it is once thrown into engagement. The pawl is centrally mounted on a pin 35, which projects through the side of the frame, and on the outer end of this pin is a thumb-piece 36, by means of which the pawl may be turned into or out of engagement with its ratchet-wheel. In practice but one pawl is thrown into engagement at a time as the pawls are oppositely arranged, so as to correspond with the inclination of the teeth on the ratchet-wheel, and one pawl will be used to turn the hub in one direction and the other to turn it back in the opposite direction. The construction above described provides for cutting off a pipe, and to do this the hub 13 is slipped upon the pipe to be cut. The slide-block 23 is adjusted by means of the handle 27 and screw 25, so that the cutter 24 will bear upon the pipe, and by turning forward and back upon the handle 27 the cutter will force its way into the pipe and the handle 27 may be turned occasionally, so as to gradually force the cutter into the pipe.

It will be noticed by reference to Figs. 7 and 8 that the hub 13 has an angular bore extending longitudinally through it, and the object of this is to provide for holding the threader 37 (see Fig. 5) in place. This threader 37 has a longitudinal bore 38 extending through it and has a reduced angular central portion 39, which is shaped to fit the bore of the hub 13, and the corresponding angles of the hub and threader will cause them to turn together.

The threader has near the center and on one side a recess 40, adapted to fit over the plate 20 in the hub, and it has also a groove 41, adapted to fit over the cutter 24 in the slide-block 23. When the threader is inserted in the hub, the slide-block is drawn back to its greatest extent, and this groove 41 fits over the cutter, as shown in Fig. 3. The threader is cut through to the bore on each side of the center, so as to produce a dovetail section 42, as shown in Fig. 5, which section is adapted to fit between the slide-block 23 and the opposite portion of the key 21, and thus form a continuous top surface to the key to fit the recess 17 of the part 15 of the hub.

One end portion 43 of the threader is enlarged and abuts with the reduced portion 12 of the hub 13, and this portion 43 carries a washer 44 at its end, which washer has a central aperture and is adapted to hold in place a die 45, which fits a central recess in the end of the threader, and when a smaller die is used a washer 44, having inside square shoulders to fit against the die, may be secured to the threader, so as to hold the die in place. The opposite end portion 46 of the threader fits against the opposite end of the hub, and this portion is internally screw-threaded, so as to receive a threaded sleeve 47, having a head 48, adapted to abut with the end of the threader, and this sleeve 48 is also internally screw-threaded near the outer end, so as to receive a similar threaded screw 49, having an outer head 50, and, if desired, still other sleeves may be added. These sleeves are provided with countersunk screws 50ª, which extend transversely through one side of each sleeve, and the screws are adapted to bind the sleeves to a pipe.

To thread a pipe, the threader, which is held in the hub and frame, as described, is slipped upon the pipe, the sleeve end of the threader being pushed on first, and when the end of the pipe reaches the die the sleeve 48 or 50, as the case may be, is secured to the pipe and the hub is turned by means of its frame handle or handles in the manner already described, and the movement of the hub and threader will cause the sleeve to draw the body of the machine upon the pipe, thus forcing the die upon the pipe and the hub and connected parts are turned until a thread of sufficient length is cut. It will be seen that by providing these threaded sleeves, as described, they serve to start the die upon the pipe, so that there is no need of laying out any considerable amount of strength and the thread is started at once.

In Fig. 12 we have shown a modified means for securing the frame 10 to the reduced end of the hub, and in this case the frame is recessed, as described, but is provided with a strap-hinge 51, adapted to encircle a portion of the hub, and the free end of the hinge is secured to the adjacent end of the frame by means of a catch 52, which is pivoted on the frame and locks over a pin 53 on the hinge.

Having thus described our invention, we claim as new and desire to secure by Letters Patent—

1. A machine of the character described, comprising a separable hollow hub, a locking-key to hold the parts of the hub together, a slide-block mounted on the key and having a cutter thereon, and a ratchet mechanism for turning the hub, substantially as described.

2. A machine of the character described, comprising a separable hollow hub, the parts having registering dovetail recesses therein, a locking-key shaped to fit the recesses, a slide-block mounted on the locking-key and provided with a cutter, a screw for adjusting the slide-block, and a ratchet mechanism for turning the hub, substantially as described.

3. A machine of the character described, comprising a hollow separable hub, a locking-key extending transversely through the hub and adapted to hold the parts of the hub together, a slide-block carrying a cutter and held to move on the locking-key, a frame pivoted on the hub and having a ratchet connection therewith, and a handle for the frame, said handle being also arranged to adjust the slide-block, substantially as described.

4. A machine of the character described, comprising a longitudinally-separable hub having transverse dovetail recesses therein and having oppositely-arranged ratchet-wheels secured to its ends, a locking-key arranged to hold the parts of the hub together, a slide-block mounted on the key and carrying a cutter, a screw extending through one end of the key and adapted to adjust the slide-block, a frame pivoted on the ends of the hub and having a ratchet connection therewith, and a handle journaled in the frame, said handle having a socket at its inner end to fit the slide-block screw, substantially as described.

5. A machine of the character described, comprising a revoluble hub having an angular bore therein, a threader having a reduced central portion to fit the bore of the hub and having a longitudinal bore therein, a die carried at one end of the threader, and a feed-sleeve having a thread to fit a thread in the opposite end of the threader, substantially as described.

6. The combination, with a removable hub having an angular bore, of a threader having a reduced central portion shaped to fit the bore of the hub, the threader having also a longitudinal bore therein, a cutting-die held in one end of the threader, and a series of sleeves arranged in the opposite ends of the threader, said sleeves having means for attachment to a pipe, one sleeve having a thread adapted to turn in the threader and the remaining sleeves being threaded one into the other, substantially as described.

GEORGE W. BOWMAN.
JOHN C. GODFREY.

Witnesses:
J. B. PHILIPPI,
W. T. ROBERTS.